United States Patent [19]

Ushikubo

[11] Patent Number: 4,778,983
[45] Date of Patent: Oct. 18, 1988

[54] AUTOMATIC VENDING MACHINE
[75] Inventor: Kohei Ushikubo, Isesaki, Japan
[73] Assignee: Sanden Corporation, Gunma, Japan
[21] Appl. No.: 918,064
[22] Filed: Oct. 14, 1986
[30] Foreign Application Priority Data Oct. 12, 1985 [JP] Japan .................. 60-227486
Oct. 12, 1985 [JP] Japan .................. 60-227484
Oct. 14, 1985 [JP] Japan .................. 60-229545
Oct. 14, 1985 [JP] Japan .................. 60-229547

[51] Int. Cl.⁴ ............................................ G06F 7/08
[52] U.S. Cl. ...................................................... 235/381
[58] Field of Search ........................................ 235/381

[56] References Cited
U.S. PATENT DOCUMENTS 4,532,418 7/1985 Meese ................................. 235/381

Primary Examiner—Harold I. Pitts
Attorney, Agent, or Firm—Banner, Birch, McKie & Beckett

[57] ABSTRACT

An automatic vending machine is disclosed that operates in response to a card inserted by a user. The card contains identification information which is used to access data stored in a memory device regarding the amount of money the user has credited to his account. If the account balance exceeds the purchase price of a desired item, the item is supplied to the user and the amount of the purchase is deducted from his account. A user may increase his account balance at any time by inserting money into the machine. Security is maintained through the use of a security code which the user inputs into the machine after the card is inserted.

7 Claims, 3 Drawing Sheets

AUTOMATIC VENDING MACHINE

BACKGROUND OF THE INVENTION

The present invention relates to an automatic vending machine and, more particularly, to an automatic vending machine in which goods or the like are dispensed in response to the use of a key card.

In automatic vending machines, it is common for cash (coins or bills) to be used for inducing a sale. More recently, automatic vending machines which are operated exclusively by various types of key cards are employed for inducing a sale. In some vending machines, payment can be made while using such a card.

Methods of payment for purchases from automatic vending machines using a card system fall into two categories, payment in advance and credit type payment. In accordance with the payment in advance method, a user purchases a card in advance for cash, the amount being stored on the card by suitable means such as a magnetic strip. Each time the card is used in the machine, the recorded information is appropriately changed so as to indicate the remaining credit amount. Therefore, the vending machine operator safely obtains the cash in advance. In accordance with the credit type payment method, a card holder utilizes a vending machine for a purchase using a card which has been issued to him. The amount of each purchase is stored in the machine, and the amounts debited against each card are accumulated over a predetermined period of time and are then billed to each card user at the end of that period. In this system, the collection of the amount owed can be complicated and sometimes impossible.

Advance payment type cards are preferable and utilized in most vending machines of this type. Such vending machines, however, must be provided with a complex card reader to identify the amount remaining on each card and must also be able to change the amount after a purchase has been made. These types of card readers are very expensive and cards used in this method are typically abandoned when the amount of credit shown on the card is expended, making the costs of card provision higher.

Furthermore, in recent years, the variety of merchandise that may be stored within one vending machine has greatly increased. In beverage vending machines, for example, coffee vending machines, the number of selections has increased, such as the type of coffee bean, the amount of cream and sugar, etc. Therefore, customers will select one of a large number of items. The operation of automatic vending machines has, therefore, become more complicated.

SUMMARY OF THE INVENTION

It is a primary object of this invention to provide an improved automatic vending machine in which advance payment card systems are used for effecting purchases without the need for a complex card reader device.

An automatic vending machine in accordance with the present invention includes means for identifying stored identification information on a card, a memory unit for storing the identification information of each card and the amount of money stored on the card, means for discriminating and counting the amount of money deposited, and a control circuit to supply merchandise after a comparison between the price of the selected merchandise and the amount of credit available which is extracted from a memory unit in accordance with the identification information. The control circuit also corrects the amount stored after supplying the selected merchandise.

Further objects, features and other aspects of this invention will be understood from the detailed description of the preferred embodiments of the invention referring to the annexed drawings.

DETAILED DESCRIPTION OF THE PREFERRED EMBODIMENTS

Figure 1:
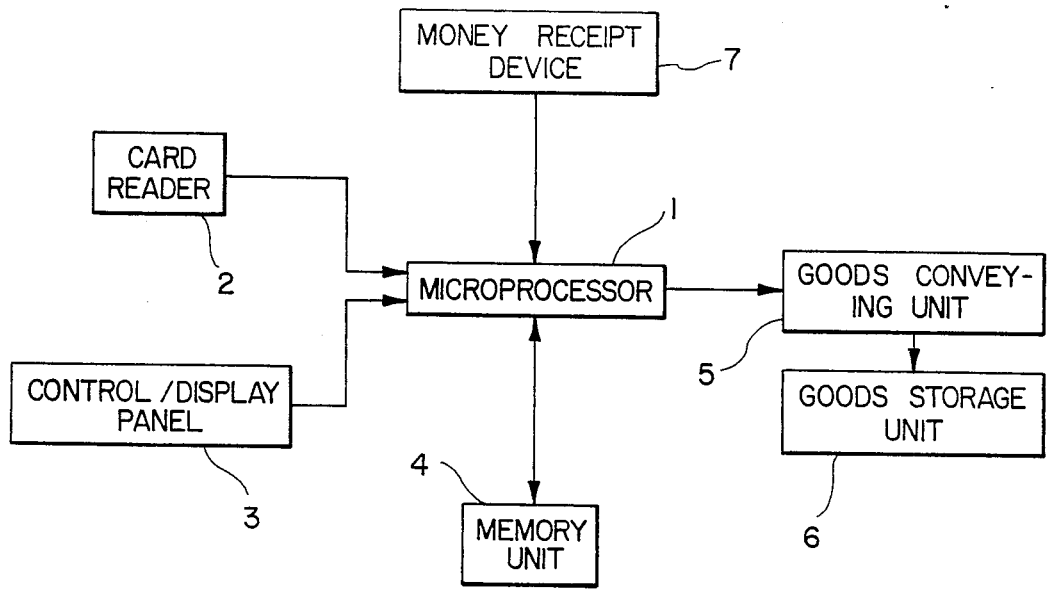
FIG. 1 is a block diagram of one embodiment of an automatic vending machine according to the invention.

FIG. 1 shows the relationship between various elements housed in an automatic vending machine constructed in accordance with the present invention. Microprocessor 1 is connected to card reader 2 for receiving therefrom card identifying information. Card reader 2 may comprise any standard card reading device which is capable of reading information stored on a card such as that contained on a magnetic strip. Microprocessor 1 is also coupled to control and display panel 3 through which a customer selects the desired merchandise stored in the vending machine, i.e., control/display panel 3 is provided with selecting switches and display means to indicate information stored in the memory unit, as described below.

Microprocessor 1 is also coupled to card memory unit 4. Card memory unit 4 stores card identification information corresponding to cards which have been registered by an operator of the vending machine. Therefore, each customer or card holder has different identification information. Card memory unit 4 is in communication with microprocessor 1 for receiving card identification information to be stored together with information relating to the prepaid amount of each card, i.e. the customers credit balance.

Microprocessor 1 is further connected to a merchandise conveying unit 5 which is coupled to a merchandise storage unit 6. Merchandise conveying unit 5 is responsive to an authorization signal received from microprocessor 1 and retrieves selected merchandise from storage unit 6 and supplies the merchandise to the customer. Both conveying unit 5 and storge unit 6 may comprise known components found in conventional automatic vending machines., The system includes a cash discrimination device 7 which detects the amount of deposited money. The amount of money deposited is stored in memory unit 4 through microprocessor 1 in accordance with each card identification information. Therefore, the amount of money deposited is stored under the identification information of each card.

In the above-described automatic vending machine, a customer who wishes to use the vending machine should obtain a card which has personal identification information stored thereon. Initially, each customer should insert the card into simple card reader 2 provided in the automatic vending machine. The customer then deposits a suitable amount of money, for example one dollar, through discrimination device 7. Card memory unit 4 stores combined information relating to the card identification information and amount of money deposited. Control/display panel 3 will indicate to the customer the amount deposited. Thereafter, the customer can purchase merchandise from the automatic vending machine at any time. The customer may purchase any merchandise stored in the vending machine up to the desposited amount. When a customer inserts the card, card reader 2 will read the identification information and retrieve the amount remaining in that account and display this amount to the customer. The customer then selects the desired merchandise and microprocessor 1 compares the price of the selected merchandise with the amount remaining for that card, and if the amount remaining is more than the purchase price, the microprocessor 1 generates an operating signal to supply the selected goods through conveying unit 5 to the customer. Microprocessor 1 will then store the remaining amount of money in memory unit 4. The microprocessor will simply subtract the purchase price from the original amount and will store the remainder for the next transaction. This process will be repeated each time the customer makes a purchase. When the purchase price exceeds the amount stored in memory, the customer will be informed and may add money to the account.

Figure 2:
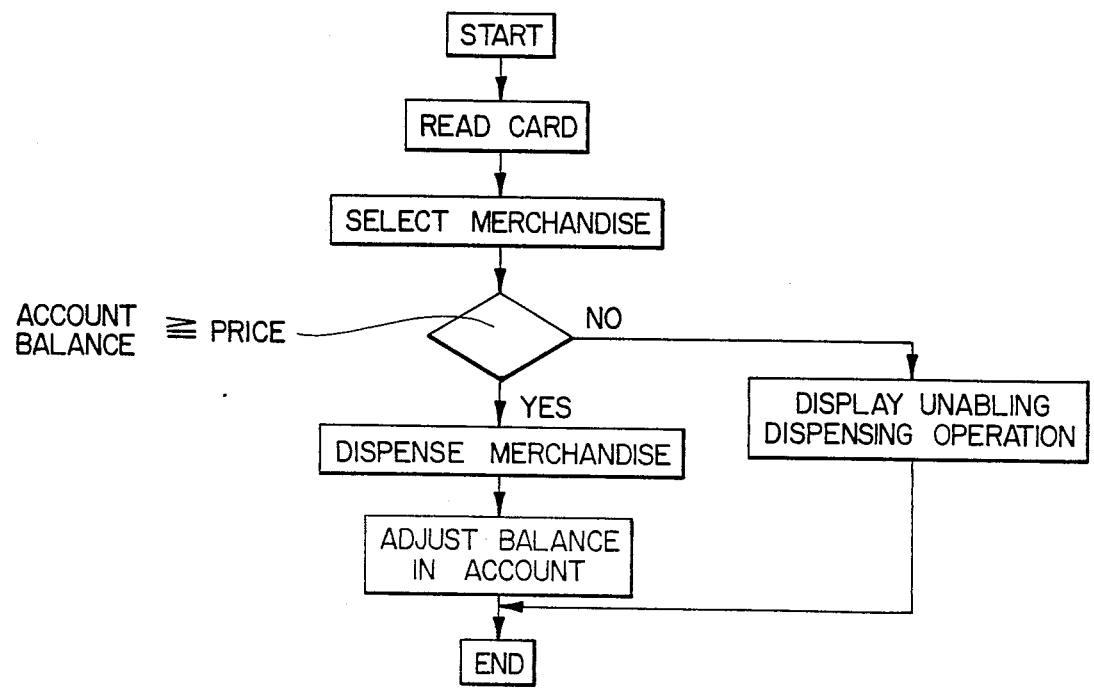
FIG. 2 is a flow chart illustrating the vending operation of the automatic vending machine of FIG. 1.

The operation of the above mentioned vending machine will be explained with reference to FIG. 2. After the customer's identification information is read through card reader 2, the customer selects merchandise through control/display panel 3. At this time, if the purchase price of the merchandise is below the amount remaining in the account, the conveying unit delivers the selected merchandise to the customer from the storage unit and the stored amount in the account is adjusted accordingly. If the purchase price of the merchandise is over the amount remaining in the account, the control/display panel indicates this condition to the customer and the customer must deposit more money to receive the merchandise.

In the above described automatic vending machine, the identification information stored on the card functions to extract specific information stored in the memory unit 4. Memory unit 4 can store selection information together with information relating to deposited money. This selection information can be used as the operating signal for the vending machine, and the customer can obtain the desired merchandise with only one action, such as pressing a confirmation or starting switch. In other words, if a customer uses a beverage dispensing machine, for example, a coffee vending machine, the customer can select the type of coffee bean, the strength of the brewed coffee and the amounts of sugar and cream by operating a plurality of selecting switches. Instead of inputting this information each time a purchase is made, the selection information is stored in memory unit 4. In this way, the customer need only enter his card and the beverage will be automatically prepared according to the stored information.

Figure 3:
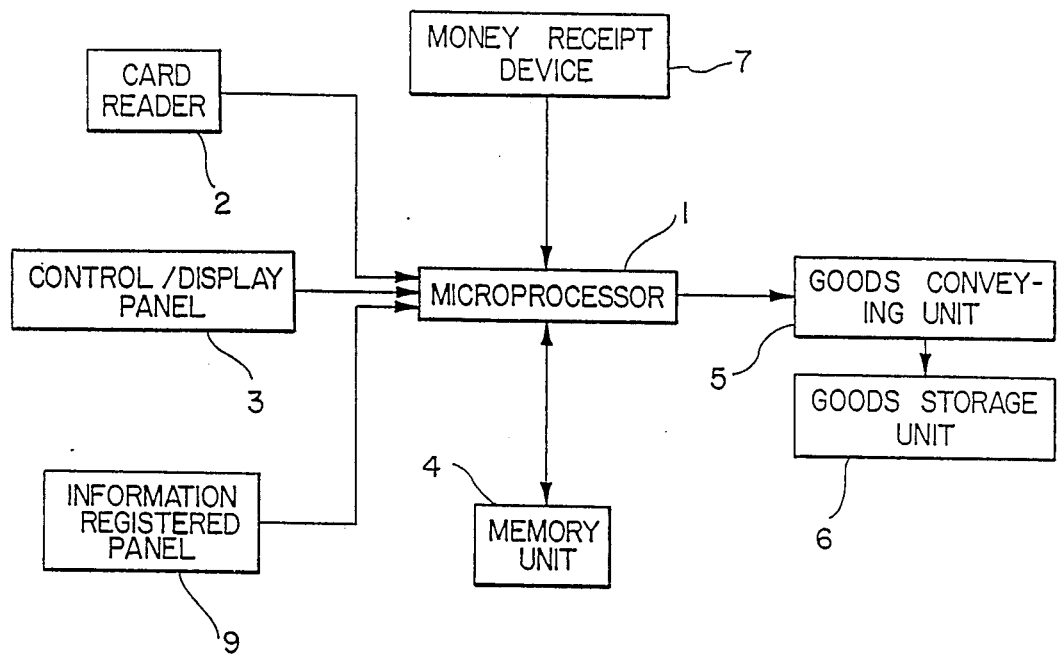
FIG. 3 is a block diagram of another embodiment of an automatic vending machine according to the invention.

There are two methods of registering selection information into memory unit 4. In the first method the identification information of the card is first confirmed by the card reader 2. Thereafter, the customer operates the selection switches in accordance with his own preferences, and the identification information of the card is reconfirmed by card reader 2. The selection information is registered in memory unit 4 together with the identification information. In the second method the last operation of the first method is eliminated, i.e., the operation of reconfirming the identification information through card read 2 is replaced by the operation of a switch on an information display panel. As shown in FIG. 3, the automatic vending machine is provided with an information display panel 9 which is coupled to microprocessor 1. Therefore, the input of the selection information is confirmed by the operation of a confirmation switch only.

Figure 4:
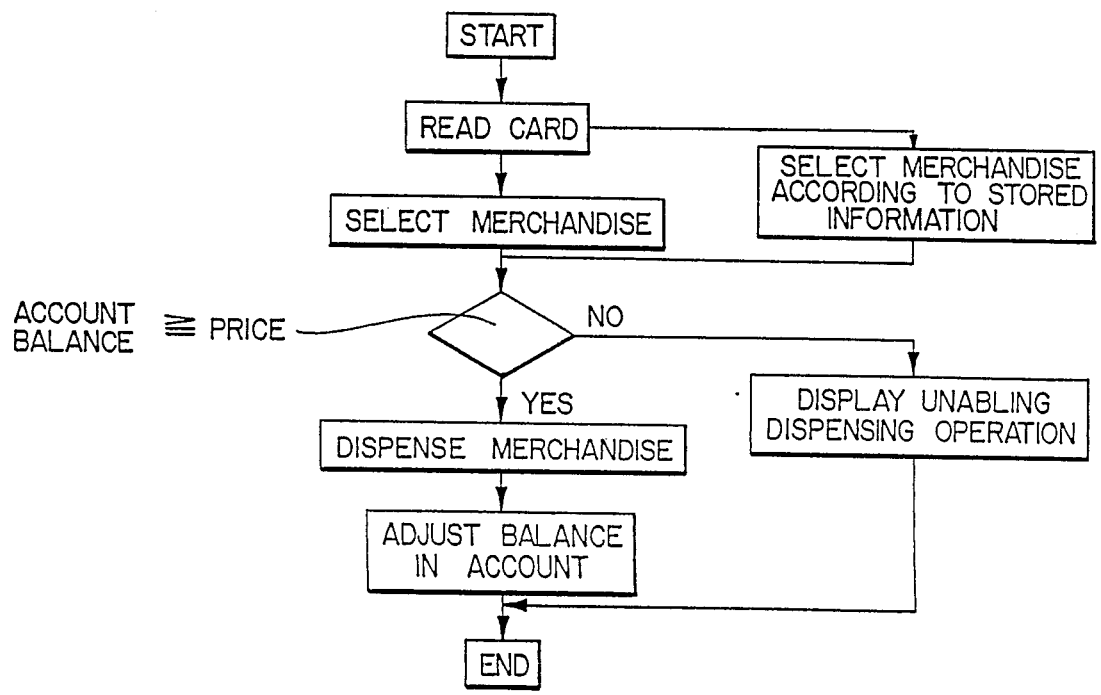
FIG. 4 is a flow chart illustrating the operation of the automatic vending machine of FIG. 3.

The operation of an automatic vending machine provided with the above-described function will be explained with reference to FIG. 4. After the card has been identified, if memory unit 4 has any stored selection information, the vending machine will prepare the merchandise in accordance with the stored information, after the operation of a confirmation or start switch. The vending operation then proceeds in the same manner explained with reference to FIG. 2. Therefore, the customer has purchased merchandise easily, utilizing information stored in memory unit 4.

Figure 5:
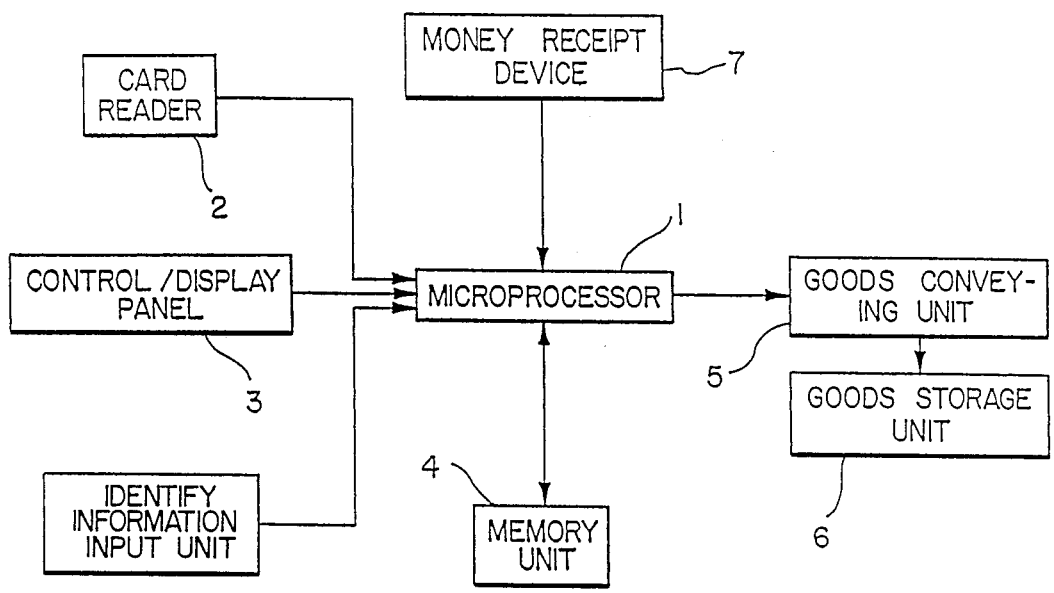
FIG. 5 is a block diagram of still another embodiment of an automatic vending machine according to the invention.

In above described automatic vending machine, the card functions only to identify and extract information from a memory unit, therefore, dishonest acts by potentially dishonest purchasers who attempt to use counterfeit cards, stolen cards or the like may not be easily prevented. To avoid this potential disadvantage, the automatic vending machine is provided with identity information input unit 8 which is coupled to microprocessor 1, as shown in FIG. 5. When information regarding the deposited amount of money is stored in memory unit 4 together with the identification information stored on the card, the customer manually inputs identity information in the form of a security code which is registered in the memory unit. Thereafter, the machine will only operate if the identification information on the card as well as the manually inputted identity information both match the registered information in memory unit 4.

Figure 6:
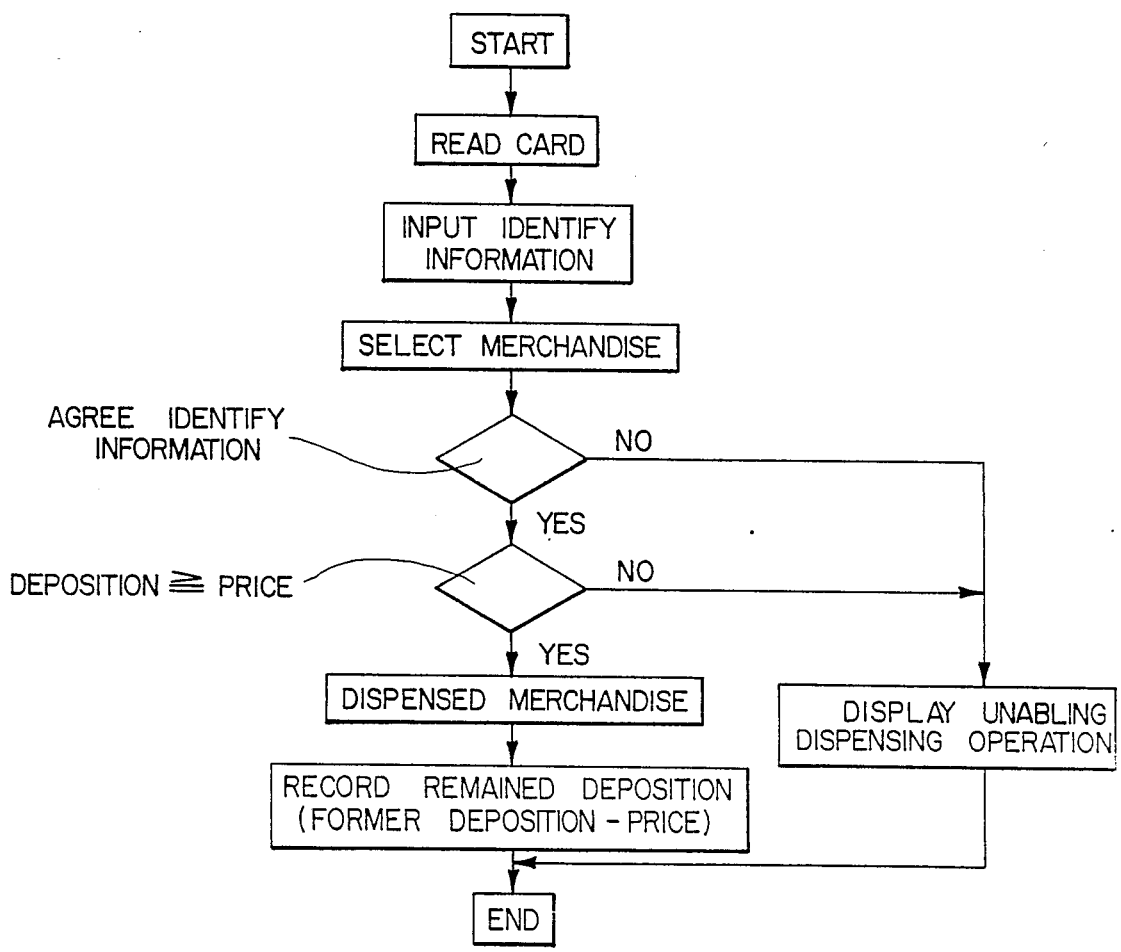
FIG. 6 is a flow chart illustrating the operation of the automatic vending machine of FIG. 5.

Referring to FIG. 6, each sustomer must input the identity information through input unit 8 after the card has been identified by card reader 2. The customer then makes his selection. At that time, microprocessor 1 compares the inputted identity information with the stored information in memory unit 4 and if the identity information matches the stored information, microprocessor 1 compares the price of the requested merchandise with the amount remaining in the account. If the identity information does not match the stored information, the control/display panel 3 indicates this fact to the customer.

This invention has been described in detail in connection with the preferred embodiments. These embodiments, however, are merely illustrative and the invention is not restricted thereto. It will be understood by those skilled in the art that other variations and modifications can be made within the scope of the present invention as defined by the appended claims.

I claim:

1. A vending machine for dispensing merchandise, said vending machine comprising:
   card reading means for reading identification information stored on a card inserted into the vending machine by a user of the machine;
   storage means for storing a credit balance of said user, said credit balance being accessed according to said identification information;
   comparison means for comparing the price of an item requested by the consumer with said credit balance; and
   dispensing means for dispensing an item to said user in response to a signal from said comparison means.

2. A vending machine according to claim 1, further comprising money receiving means for receiving money input by said user and adding means for adding the amount of money input to said credit balance.

3. A vending machine according to claim 1 wherein said dispensings means dispenses the item requested when said credit balance is greater than or equal to the price of said item requested.

4. A vending machine according to claim 1 further comprising a display means for displaying information to said user.

5. A vending machine according to claim 1 further comprising second comparison means for comparing a user supplied security code to a security code stored in said storage means in order to verify the ownership of said card.

6. A vending machine according to claim 1 wherein said storage means stores selection data previously input by said user.

7. A vending machine according to claim 1 further comprising subtraction means for subtracting the price of a dispensed item from said credit balance.

* * * * *